W. PRICE.
Shovel-Plow.
No. 11,616
Patented Aug. 29, 1854.
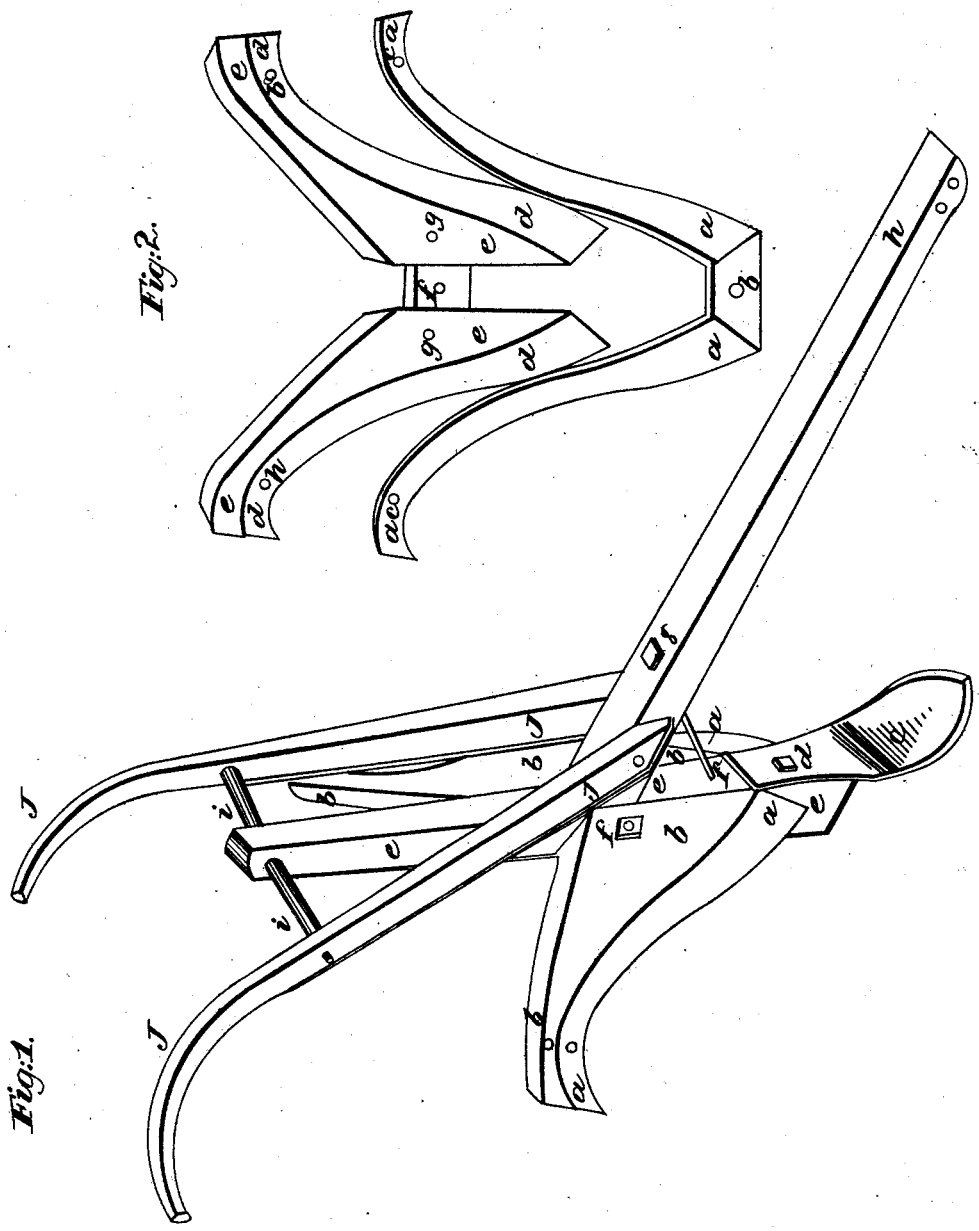

UNITED STATES PATENT OFFICE.

WHITMAN PRICE, OF GOLDSBOROUGH, NORTH CAROLINA.

IMPROVEMENT IN PLOWS FOR PLANTING POTATOES.

Specification forming part of Letters Patent No. 11,616, dated August 29, 1854.

*To all whom it may concern:*

Be it known that I, WHITMAN PRICE, of Goldsborough, in the county of Wayne and State of North Carolina, have invented and made certain new and useful Improvements in Agricultural Implements, which I designate the "Potato-Furrow Mold-Plow;" and I do hereby declare that the following is a full, clear, and exact description of the method of construction and mode of operating the same, reference being had to the accompanying drawings, making a part of this specification, in which—

Figure 1 is a perspective view of the implement complete, $a\ a\ a$ being the skimmer-plate, $b\ b\ b\ b$ being the detachable yoke mold-board; $c$, the shovel or blade; $d$, the bolt; $e\ e\ e$, the helve or shovel beam or tree; $f\ g$, nuts and rod.

Fig. 2 is the yoke mold-board, showing form of construction thereof.

Fig. 3 is the skimmer or furrow plate.

To enable others to be skilled in the use and application of my invention and improvements, I will proceed to describe the construction and operation thereof, the nature and principles of which consist in constructing an implement of plow-like form for the purpose of opening and forming at one operation furrow ridges or trenches for the planting of potatoes, &c.

The implement is constructed with a draft-beam, $g\ h$, and tree or shovel-helve $e\ e\ e\ e$, cross-rod $i\ i$, and handles or shafts $j\ j$, bolted or pinned together. A shovel, $c$, of any desired form is constructed and fastened onto the tree $e\ e\ e$ by a bolt, $d$. Next is formed two mold-boards like Fig. 2, and a yoke-piece or cross-brace, $f$, of suitable size and strength, is fastened to the mold-board $e\ e\ e$, Fig. 2, and bolt or connecting holes $g\ g$ are formed in the boards for attaching of the same to the plow-tree $e\ e\ e$, Fig. 1.

On the front sides of the under edge of the boards, Fig. 2, are formed shoulders or rabbets $d\ h\ d\ h$, to which conforms an iron plate or share or skimmer, $a\ a\ a\ a$, Fig. 3, which is bolted onto the mold-boards through means of bolts passing through holes $b\ e\ c$. This skimmer-plate or share is formed in one piece, of the shape indicated by Fig. 3, and is inserted in a mortise or opening formed on the front part, near the butt end of the tree or helve $e\ e\ e$, the shank part $d$ of the shovel $c$ being placed over the front of the skimmer-plate and attached permanently to the helve $e\ e\ e$. A stay or strengthening rod, $g\ g$, is attached to the draft-beam $h$ and the helve $e\ e\ e\ e$.

The design of my potato-furrow mold is as follows: It has heretofore been customary, in preparing ground for planting potatoes, to break up the ground with a plow and ridge it, and then open up the ground into furrows or troughs. This operation heretofore has generally been attended with much inconvenience and imperfection in the work, the plowman not being able with the ordinary shovel or furrow plow to gage or regulate the depth and form of furrow. Again, in the ordinary mode of planting potatoes, after depositing the seed it is requisite to cover up the same by hand, which in many instances is a laborious and somewhat slow operation; but by the use of my potato-furrow implement these objections and inconveniences are entirely overcome, for after the ground is plowed and made in ridges the implement, Fig. 1, is applied to the forming of the potato-furrow by passing the implement through the length of the ridge, opening the furrow, throwing the earth off on each side, and leveling the irregular surfaces at the same time by aid of the curved ends of the skimmer-plate $a\ a\ a\ a$, Figs. 1, 2. Then, again, after the potatoes are deposited in the furrow, they may be readily covered up by running the implement along on each side of the furrow, up and down, by which means the operation of furrowing, covering, and leveling is done with facility. It will, however, be observed, in covering the furrow, that the yoke mold-board, Fig. 2, must be detached from the skimmer-plate, Fig. 3, leaving nothing but the skimmer to the plow.

By the aid of one of my potato mold-plows, one man, and one horse as much work can be accomplished by the farmer as can ordinarily be done by three hands, which is an important desideratum. Besides, the implement is cheap, simple, and durable in construction.

I am aware that double mold-boards, and also mold-boards so curved as to somewhat dress the top of furrow, have been used. These devices, therefore, I do not claim as such; but What I do claim, and desire to secure by Letters Patent of the United States, is—

The particular form of skimmer-plate *a*, in combination with mold-boards *b*, tree *e*, and shovel *c*, substantially as set forth, and shown in Fig. 1.

WHITMAN PRICE.

Witnesses:
JOHN B. GRISWOLD,
O. COOR.